Dec. 7, 1965 A. L. GODSHALL ETAL 3,221,486
RAKE
Filed May 25, 1964 2 Sheets-Sheet 1
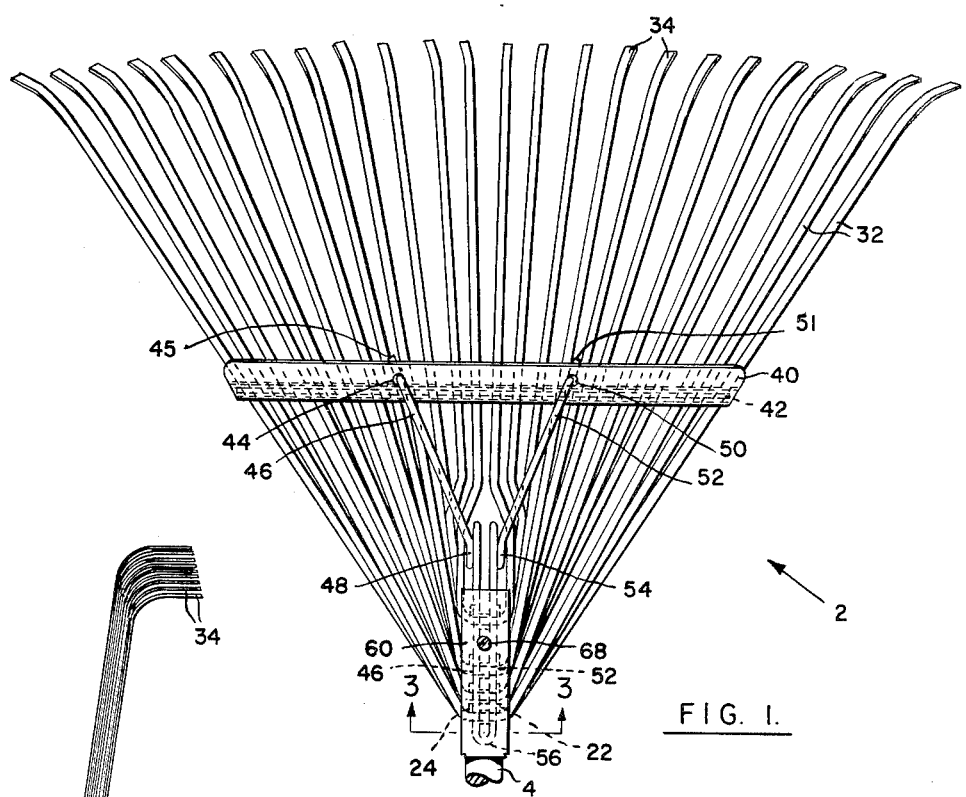
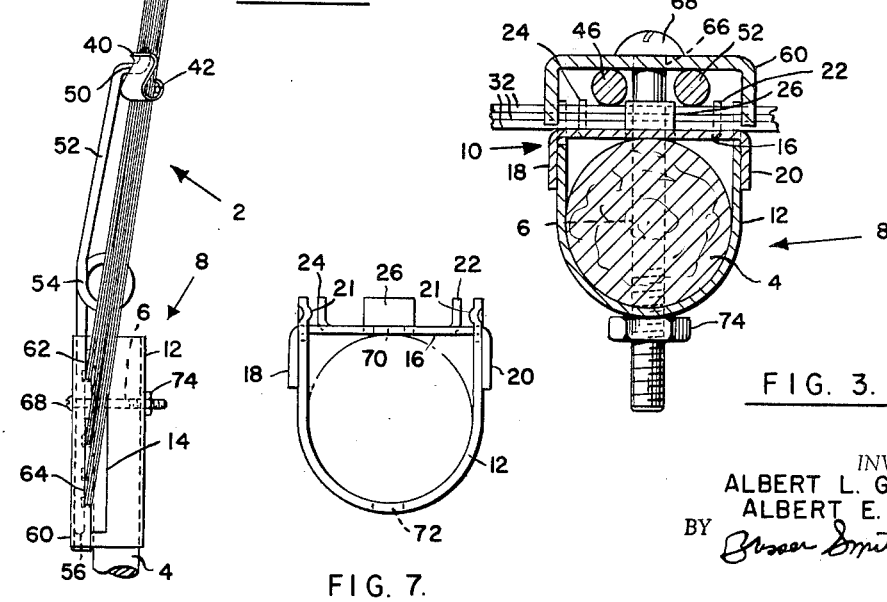
INVENTORS
ALBERT L. GODSHALL &
ALBERT E. MOORE
BY
ATTORNEYS

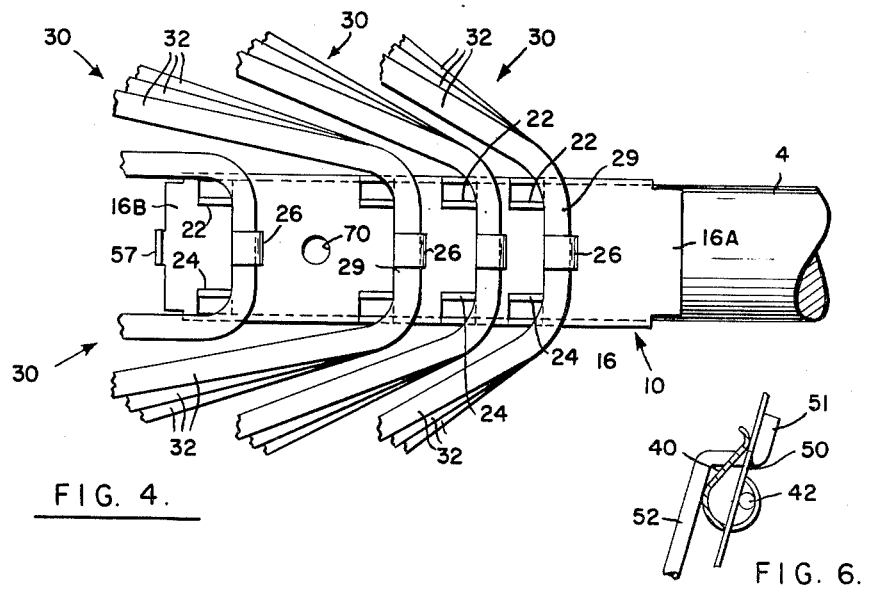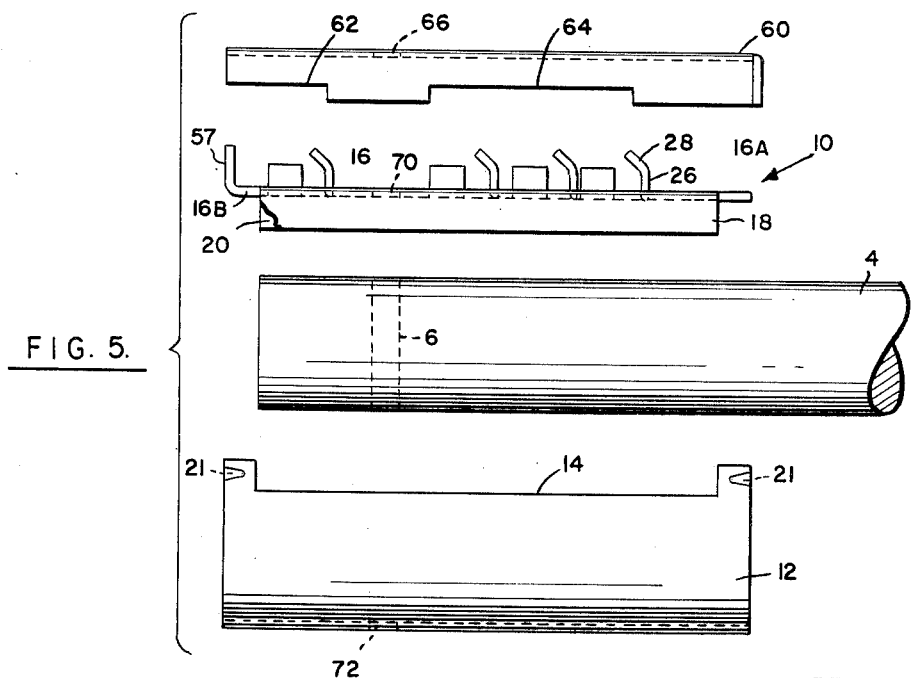

United States Patent Office 3,221,486
Patented Dec. 7, 1965

3,221,486
RAKE
Albert L. Godshall, Lansdale, and Albert E. Moore, Mainland, Pa., assignors to Ametek, Inc., New York, N.Y., a corporation of Delaware
Filed May 25, 1964, Ser. No. 369,814
7 Claims. (Cl. 56—400.17)

This invention relates to a rake and more particularly relates to a rake of the hand broom type having resilient metal tines which is useful for raking leaves and the like.

Rakes falling within this general category have been well known to the art for a substantial period of time as exemplified by Bailie Patent No. 1,959,893, issued May 22, 1934. Over the years these rakes have been substantially improved as illustrated by the rake disclosed in Dorman Patent No. 2,766,577, issued October 16, 1956.

In accordance with this invention, there is provided an improved rake of the broom type having resilient metal tines. The rake of the invention is advantageous in that it employs substantially fewer parts and is more rapidly assembled than, for example, the structure of the said Dorman patent. Both of these factors result in a substantial decrease in the cost of producing the rake. In addition, the ferrule of the invention has superior strength and accepts a wide range of handle sizes.

The invention and its objects and advantages will be clarified on reading the following description in conjunction with the drawings in which:

FIGURE 1 is a plan view partially broken away of a rake in accordance with the invention;

FIGURE 2 is a side elevation partially broken away of the rake of FIGURE 1;

FIGURE 3 is a vertical section taken on the plane indicated by the line 3—3 in FIGURE 1;

FIGURE 4 is a plan view partially broken away of the ferrule portion of the rake of FIGURE 1 with the clamping cover plate removed;

FIGURE 5 is an exploded view partially broken away of the handle, the ferrule and the clamping cover plate;

FIGURE 6 is a vertical section partially broken away through the spacer of the rake of FIGURE 1; and FIGURE 7 is an end view of the ferrule illustrating how the upper and lower clamping members are secured together.

A rake 2 in accordance with the invention has a handle 4 provided with an opening 6 for the reception of a bolt. Handle 4 is clamped in a ferrule 8 having an upper clamping member 10 and a lower clamping member 12. Member 12 has cut out portions 14 on each side to accommodate upper clamping member 10 in a range of clamping positions and the tines to be described later. Upper clamping member 10 has a substantially flat upper portion 16 which is accommodated by cut out portions 14 and downwardly extending sides 18 and 20. Upper portion 16 has narrowed extension portions 16A and 16B which extend into the interior of clamping member 12 and are locked below protrusions 21 on the inner surface of clamping member 12.

Struck upwardly from the upper portion 16 of member 10 are a plurality of ears 22 each of which lies opposite a similar struck up ear 24. Associated with each pair of opposed ears 22 and 24 is a struck up ear 26 substantially on the center line of member 10 and slightly offset from a line between ears 22 and 24. Each ear 26 has an upper portion 28 bent towards a line between the associated ears 22 and 24. Each associated group of ears 22, 24 and 26 engage the relatively straight apex portions 29 of a plurality of resilient spring steel tines 30 to restrict the movement of the tines in planes parallel to the upper surface of portion 16 of member 10. The bent portions 28 act to retain the tines to facilitate assembly. Each tine has a pair of arms 32, 32 with each arm having a downwardly bent portion 34 at its extremity. The arms 32, 32 are of various lengths and set to various angles in the conventional manner to provide a strand configuration as best seen in FIGURE 1.

The arms 32 of tine members 30 are held in a slotted spacer 40 by a rod 42 in a conventional manner. Spacer 40 has an opening 44 through which passes a hook end 45 of an arm 46 of spring wire. Arm 46 has a middle portion set into a coil 48 and extends over ferrule 8 between ear 24 and ear 26 to overlie the apex portion 29 of tine member 30. Similarly, spacer 40 has an opening 50 through which passes a hook end 51 of arm 52 of spring wire. Arm 52 has a middle portion set into a coil 54 and extends over ferrule 8 between ears 22 and 26 to overlie the apex portion 29 of tine members 30. Ear 57 struck up from member 10 separates arms 46 and 52. Arms 46 and 52 are connected by an integral loop 56 and function to resiliently resist the upward movement of spacer 40 when raking.

A clamping cover plate 60 having side cut out portions indicated at 62 and 64 to accommodate the tine members 30 is clamped downwardly against arms 46 and 52 by means of a bolt 68 which passes through an opening 66 in clamping cover plate 60, and an opening 70 in upper clamping member 10, opening 6 in handle 4 and opening 72 in lower clamping member 12. A nut 74 on bolt 68 is turned tightly against memebr 12.

The rake of the invention may be assembled in various combinations of steps. The following steps are desirable and illustrative. Upper clamping member 10 of ferrule 8 is formed with tabs 28 bent to the angle illustrated in FIGURE 5. With tabs 28 in this position, tines 30 are assembled on member 10 and tabs 28 are then bent downwardly approximately horizontal to clamp each group of tines 30 against flat upper portion 16 of member 10. Spacer 40 is then assembled to the tines 30 with the tines being locked to the spacer by rod 42. If not already precut and formed, the tine ends are now cut and formed to produce the downwardly bent portions 34. Advantageously at this stage, the thus formed assembly is de-greased, painted, air-dried and baked. Spring arms 46 and 52 are then engaged with openings 44 and 50 in spacer 40 and placed in position over the apexes of tines 30 as previously described. Clamping member 12 is then assembled to clamping member 10 with extension portions 16A and 16B lying below protrusions 21 on member 12. Clamping cover plate 60 is then positioned overlying clamping member 10 and arms 46 and 52 and the entire assembly secured together by means of bolt 68 and nut 74. The thus formed assembly and the handle 4 are normally shipped separately to the retailer. Either the retailer or the ultimate purchaser makes the final assembly by removing nut 74 and withdrawing bolt 68 while retaining clamping cover plate 60 in position with his hands. Protrusions 21 retain clamping members 10 and 12 together at this stage. Handle 4 is then inserted and the bolt 68 is passed through opening 6 in handle 4 and opening 72 in clamping member 12 and nut 74 is replaced. It will be seen that the employment of clamping members 10 and 12 to form ferrule 8 provides a handle retaining structure which can accommodate a substantial range variation in the diameter of the handles. Further, the ferrule 8 is extremely strong since the handle 4 is clamped between two solid surfaces rather than being clamped against the split portion of a ferrule as in many previous structures.

It will be understood that the above described embodiment of the invention is by way of illustration and is not intended to be limiting.

What is claimed is:

1. A rake comprising a handle,
a ferrule for the reception of said handle,
V-shaped tine members supported on the upper outer surface of said ferrule,
upstanding members on the ferrule to limit the movement of the tine members in planes parallel to the upper outer surface of the ferrule,
a spacer engaging the tine members intermediate the ferrule and the ends of the tine members,
a pair of spring wire arms each engaging the spacer and each overlying and engaging a portion of the tine members overlying the ferrule, and
means to clamp said arms against said tine members to in turn clamp the tine members against the ferrule.

2. A rake comprising a handle,
a ferrule for the reception of said handle,
V-shaped tine members supported on the upper outer surface of said ferrule,
at least three spaced upstanding members on the ferrule to limit the movement of the tine members in planes parallel to the upper outer surface of the ferrule,
a spacer engaging the tine members intermediate the ferrule and the ends of the tine members,
a pair of spring wire arms each engaging the spacer and each overlying and engaging a portion of the tine members overlying the ferrule, and
means to clamp said arms against said tine members to in turn clamp the tine members against the ferrule.

3. A rake comprising a handle,
a ferrule for the reception of said handle comprising an upper member and a separate lower member in clamping relation with respect to said handle,
V-shaped tine members supported on the upper outer surface of said ferrule,
upstanding members on the upper member of the ferrule to limit the movement of the tine members in planes parallel to the upper outer surface of the upper member of the ferrule,
a spacer engaging the tine members intermediate the ferrule and the ends of the tine members,
a pair of spring wire arms each engaging the spacer and each overlying and engaging a portion of the tine members overlying the ferrule, and
means to clamp said arms against said tine members to in turn clamp the tine members against the ferrule including a clamping cover plate overlying the spring wire arms.

4. A rake comprising a handle,
a ferrule for the reception of said handle comprising an upper member and a separate lower member in clamping relation with respect to said handle,
V-shaped tine members supported on the upper outer surface of said ferrule,
at least three spaced upstanding members on the upper member of the ferrule to limit the movement of the tine members in planes parallel to the upper outer surface of the upper member of the ferrule,
a spacer engaging the tine members intermediate the ferrule and the ends of the tine members,
a pair of spring wire arms each engaging the spacer and each overlying and engaging a portion of the tine members overlying the ferrule, and
means to clamp said arms against said tine members to in turn clamp the tine members against the ferrule including a clamping cover plate overlying the spring wire arms.

5. A rake comprising a handle,
a ferrule for the reception of said handle comprising an upper member and a separate lower member in clamping relation with respect to said handle,
a plurality of groups of V-shaped tine members with the tine members of each group having apex portions in vertical alignment and supported on the upper member of the ferrule,
a pair of opposed outer upstanding ears and a central upstanding ear engaging the apex portions of each group of tine members,
a spacer engaging the tine members intermediate the ferrule and the ends of the tine members,
a pair of spring wire arms each engaging the spacer and each positioned between the central ears and the adjacent outer ears and overlying and engaging the apex portions of each group of tines, and
means to clamp said arms against said tine members to in turn clamp the tine members against the ferrule including a clamping cover plate overlying the spring wire arms.

6. A rake in accordance with claim 5 in which the upper member and lower member are each substantially U-shaped members and are telescoped together.

7. A rake in accordance with claim 5 in which the upper member and lower member are each substantially U-shaped members and are telescoped together,
one of said members having an extension member at each end adapted to enter within the other member and the said other member having openings in its sides to accommodate the top of said one member, and
means releaseably engaging the said extensions to hold the members together.

References Cited by the Examiner
UNITED STATES PATENTS

| | | | |
|---|---|---|---|
| 2,137,795 | 11/1938 | Bailie | 56—400.17 |
| 2,316,168 | 4/1943 | James | 56—400.17 |
| 2,766,577 | 10/1956 | Dorman | 56—400.17 |

ABRAHAM G. STONE, *Primary Examiner.*
ANTONIO F. GUIDA, *Examiner.*